(12) United States Patent
Bowman

(10) Patent No.: US 7,285,733 B2
(45) Date of Patent: *Oct. 23, 2007

(54) RECESSED POKE-THRU FITTING

(75) Inventor: Timothy S. Bowman, Parkersburg, WV (US)

(73) Assignee: The Wiremold Company, West Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/407,483

(22) Filed: Apr. 20, 2006

(65) Prior Publication Data

US 2006/0201706 A1    Sep. 14, 2006

Related U.S. Application Data

(63) Continuation of application No. 11/095,382, filed on Mar. 30, 2005, now Pat. No. 7,183,501.

(60) Provisional application No. 60/557,654, filed on Mar. 30, 2004.

(51) Int. Cl.
*H02B 1/40* (2006.01)

(52) U.S. Cl. .................. 174/480; 174/483; 174/50; 174/53; 220/3.2; 220/3.3

(58) Field of Classification Search .............. 174/48, 174/49, 50, 57, 59, 58, 68.1, 53, 121 A, 63, 174/64, 480, 481; 220/3.2, 3.3, 3.4, 3.5, 220/3.6, 3.7, 3.8, 4.02, 3.92; 248/906, 343; 439/535, 131, 142, 650, 652, 538, 536, 537, 439/539, 925; D13/152; 52/220.1, 220.8, 52/232

See application file for complete search history.

(56) References Cited

U.S. PATENT DOCUMENTS

| | | | |
|---|---|---|---|
| 1,066,215 A | | 7/1913 | Murray |
| 1,456,385 A | * | 5/1923 | Kvarnstrom ............... 220/3.92 |
| 4,059,321 A | | 11/1977 | Rasmussen |
| 4,551,577 A | * | 11/1985 | Byrne .......................... 174/57 |
| 4,612,412 A | * | 9/1986 | Johnston ...................... 174/57 |
| 4,656,798 A | * | 4/1987 | Hazen ......................... 174/488 |
| 4,747,788 A | * | 5/1988 | Byrne .......................... 174/57 |
| 5,023,396 A | | 6/1991 | Bartee |
| 5,122,069 A | | 6/1992 | Brownlie |
| 5,231,562 A | | 7/1993 | Pierce |
| 5,351,173 A | * | 9/1994 | Byrne ......................... 439/131 |
| D406,102 S | | 2/1999 | Byrne |
| 5,874,692 A | * | 2/1999 | Simmons ..................... 174/53 |
| 5,921,795 A | | 7/1999 | Weener |
| 6,024,599 A | | 2/2000 | Stathis |
| 6,234,812 B1 | | 5/2001 | Ivers |
| 6,290,518 B1 | * | 9/2001 | Byrne .......................... 174/57 |
| D456,357 S | | 4/2002 | Gershfeld |
| 6,416,336 B1 | | 7/2002 | Schulte |
| 6,848,227 B2 | * | 2/2005 | Whitty ....................... 52/220.8 |

* cited by examiner

*Primary Examiner*—Angel R. Estrada
(74) *Attorney, Agent, or Firm*—McAndrews, Held & Malloy, Ltd.

(57) ABSTRACT

A poke-thru fitting includes a plurality of stacked modules, each of the plurality of stacked modules being configured to retain at least a power receptacle and a communication receptacle, wherein an axial cross-sectional envelope of the fitting remains constant despite the number of the plurality of stacked modules.

18 Claims, 2 Drawing Sheets

RECESSED POKE-THRU FITTING

RELATED APPLICATIONS

This application is a continuation of U.S. application Ser. No. 11/095,382, entitled "Recessed Poke-Thru Fitting," filed Mar. 30, 2005 now U.S. Pat No. 7,183,501, which relates to and claims priority benefits from U.S. Provisional Patent Application Ser. No. 60/557,654 entitled "Recessed Poke-Thru Fitting," filed Mar. 30, 2004, both of which are incorporated by reference herein in their entireties.

BACKGROUND OF THE INVENTION

In-floor fittings such as poke-thru fittings, afterset fittings, and preset fittings are installed in concrete floors to provide electrical receptacles and communication/data receptacles (or jacks) at desired locations in buildings. Poke-thru fittings are designed to be installed in an opening in a floor, such as a concrete slab or steel deck, in a building structure such as an office building to provide electrical receptacles and/or communication/data receptacles at desired locations in buildings. As explained in U.S. Pat. No. 4,770,643, source power and signal cables, loosely positioned in a plenum, which is between the ceiling of the floor below and the floor above (that is, the floor in which the opening is in), may be pulled from the plenum and connected with or passed through the poke-thru fitting for activation of services for and on the floor above. More specifically, high voltage source power cables are connected with power receptacles that may be mounted within the poke-thru fitting or surface mounted on the floor above the fitting. Lower voltage communication/data signal cables have traditionally been passed through the poke-thru fitting to provide above floor connections between these cables and equipment positioned on the floor above. More recently, poke-thru fittings have been developed that also provide for mounting the communication/data receptacle within the fitting.

Standards promulgated by Underwriters Laboratories (UL) require poke-thru fittings to enable the fire rating of the floor to be substantially the same with or without the floor opening and fitting therein. As a result, poke-thru fittings typically incorporate fire-retarding material, generally intumescent material, to retard the transmission of heat and flame from a fire in the plenum, for example. The intumescent material is activated upon exposure to a fire's heat and flames, rising through the floor opening from a fire below the floor. The intumescent material absorbs the heat and expands to fill open spaces in the floor.

One typical style of a poke-thru fitting includes intumescent material that penetrates the concrete floor and a monument-style service head. The service head includes power and communication devices and is positioned above the floor. Penetration through the floor by the service head is minimized due to the fact that only wire and cabling are passed through the intumescent. The minimized floor penetration also reduces the labor cost of drilling into the concrete floor. That is, because a smaller hole is used, less drilling is required than if a larger hole were needed. Additionally, because a smaller hole is used, less intumescent material is needed.

In order to increase functionality of the poke-thru fitting, larger service heads are used. That is, in order to house additional power and communication devices within a service head, the service head typically needs to be larger to accommodate the additional components. However, larger service heads are more obtrusive than smaller service head. Further, while a larger service head allows for increased functionality, larger service heads may also be less aesthetically acceptable due to the fact that they take up more space than smaller service heads.

A second type of poke-thru fitting was developed to address the objectionable aesthetics of the monument-style poke-thru fitting. The second type of poke-thru fitting includes power and communication devices turned face-up with the floor, and are mounted flush with the floor surface. In order to obtain a low profile, the sides and back of the device are below the surface of the floor. The width of the poke-thru fitting (i.e., the diameter), however, must be large enough to accommodate the components contained within the fitting. As the diameter of the fitting increases, additional intumescent material is needed. Further, the number of devices housed within such a poke-thru fitting is limited.

Thus, a need exists for a poke-thru fitting that overcomes the drawbacks and deficiencies noted above.

SUMMARY OF THE INVENTION

Certain embodiments of the present invention provide an improved poke-thru fitting configured to be positioned within a floor. The poke-thru fitting includes a plurality of stacked modules, each of the plurality of stacked modules being configured to retain at least a power receptacle and a communication receptacle, wherein an axial cross-sectional envelope of the fitting remains constant despite the number of the plurality of stacked modules. The system may also include an upper cable-receiving portion secured to a first one of the plurality of stacked modules, and a collar configured to be secured within the floor, wherein the upper cable-receiving portion is configured to be slidably retained by the collar.

Figure 1:
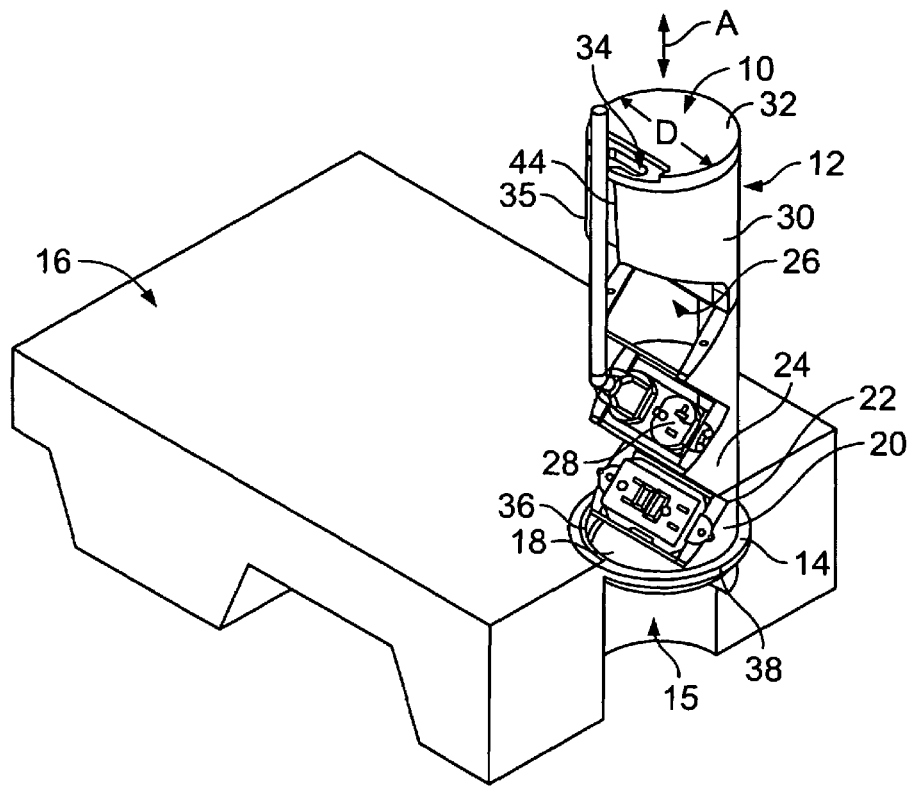
FIG. 1 illustrates an isometric view of a poke-thru fitting according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an isometric view of a poke-thru fitting 10 according to an embodiment of the present invention. The poke-thru fitting 10 includes a main body 12 and a collar 14. Prior to the main body 12 being inserted into hole 15 or other type of cavity formed in a floor 16, the collar 14 is positioned within the hole 15. The collar 14 is configured to be secured over and/or within the hole 15. The collar 15 includes a central opening 18 sized to allow the main body 12 to slide therethrough in the directions denoted by line A.

The main body 12 includes a series of receptacle modules 20 stacked over one another. The modules 20 may be bolted, bonded, or otherwise secured to one another. Optionally, the modules 20 may include latches, clasps and the like, and reciprocal structures that allow the modules to be snapably, latchably, or otherwise removably secure to one another. For example, a top portion 22 of a module 20 may be permanently or removably secured to a bottom portion 24 of another module 20.

Each module 20 includes an interior cavity 26 configured to receive and retain a receptacle 28, such as a power or communication receptacle. A cylindrically or semi-cylindrically shaped cable-receiving portion 30 is permanently or removably secured to a module 20. Additional modules 20 may be permanently or removably secured beneath the top module 20. The cable-receiving portion includes a lid 32 having a cable passage 34 that allows a cable 35 to pass therethrough. The diameter D of the lid 32 is larger than the diameter of the collar 14. Thus, when the main body 12 is slid into the collar, downward movement of the main body 12 ceases as the lid 32 engages the collar 14. The collar 14 includes a lower inner ring 36 and an upper outer ring 38. The diameter of the outer ring 38 may exceed the diameter D of the lid 32, while the diameter of the inner ring 36 may be smaller than the diameter D of the lid 32. Further, the inner ring 36 may be recessed downwardly from the outer ring 38 so that when the main body 12 is secured within the collar 14, the lid 10 is flush with the top surface of the collar 14, which may be flush with the surface of the floor 16.

Figure 2:
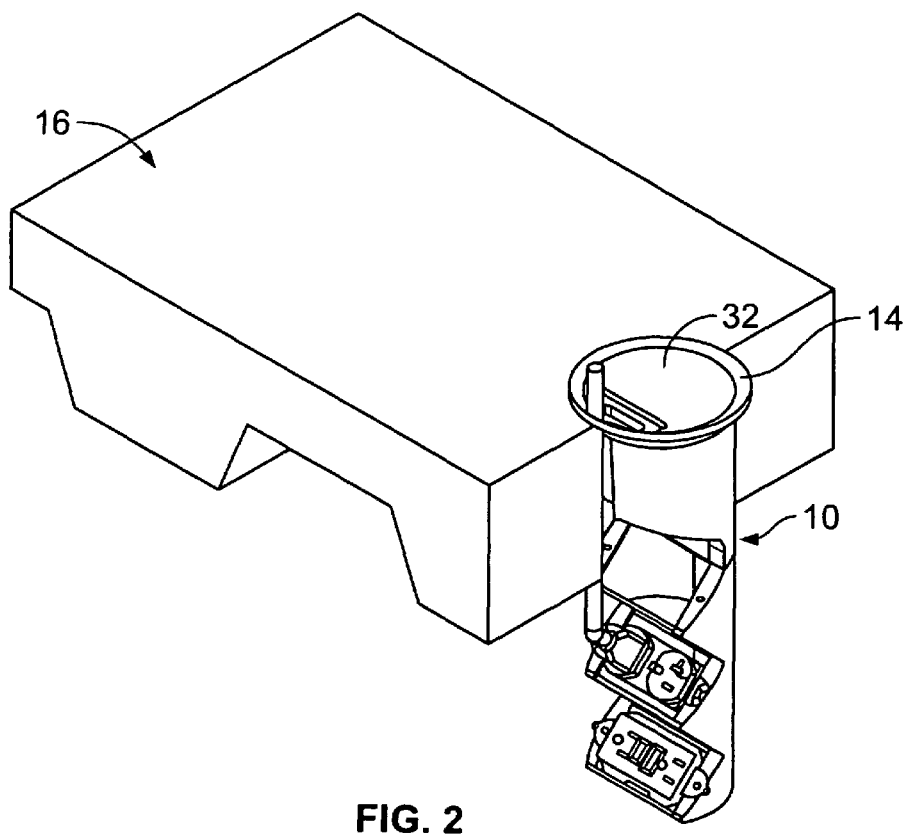
FIG. 2 illustrates an isometric view of a poke-thru fitting in a fully secured position within a floor according to an embodiment of the present invention.

FIG. 2 illustrates an isometric view of the poke-thru fitting 10 in a fully secured position within the floor 16. As shown in FIG. 2, the lid 32 and collar 14 are flush with the surface of the floor 16.

Figure 3:
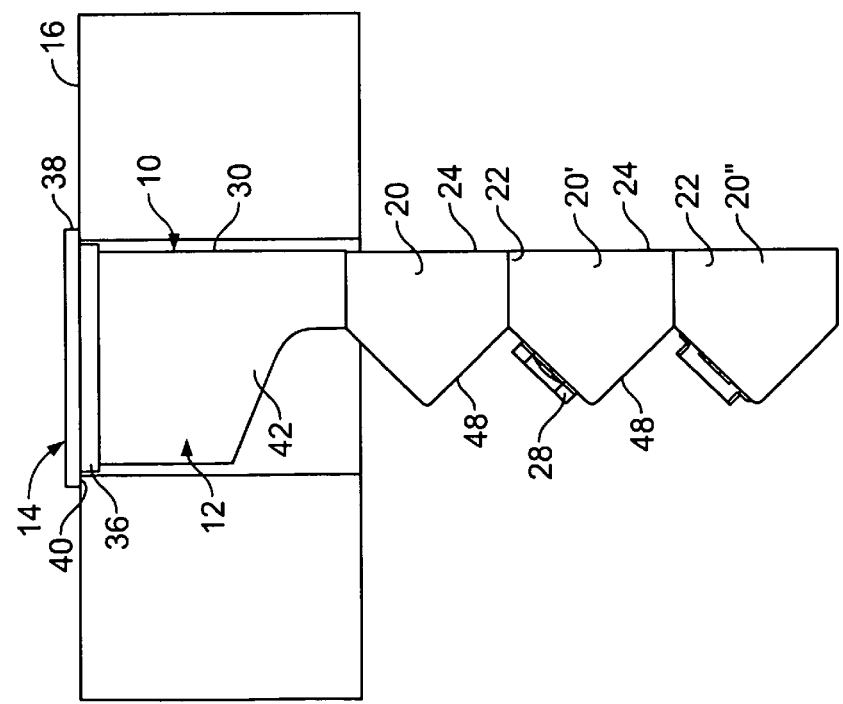
FIG. 3 illustrates a side view of a poke-thru fitting in a fully secured position within a floor according to an embodiment of the present invention.

FIG. 3 illustrates a side view of the poke-thru fitting 10 in a fully secured position within the floor 16. As shown in FIG. 3, the top outer ring 38 of the collar 14 rests above the surface of the floor 16, while the lower inner ring 36 is positioned under, and/or flush with, the surface of the floor 16. A bottom surface 40 of the top outer ring 38 abuts the upper surface of the floor 16. The profile of the cable-receiving portion 30 tapers at a lower portion 42 to allow access to the upper module 20. As shown in FIG. 1, the cable receiving portion 30 also includes a cable channel 44 that allows cables to pass therethrough.

As explained above, the module 20 is permanently or removably secured to the cable-receiving portion 30. Further, a top portion 22 of the module 20' is permanently or removably secured to a bottom portion 24 of the module 20. Similarly, a top portion 22 of the module 20" is permanently or removably secured to a bottom portion 24 of the module 20'.

The modules 20, 20' and 20" are shaped so that the receptacles 28, when retained within the cavities 26 (shown, for example, in FIG. 1), are angled with respect to the surface of the floor 16. Further, the modules 20, 20' and 20" include sloped surfaces 48 that are configured to provide access to a receptacle 28 of a module, such as module 20', that may be positioned below another module, such as module 20.

In order to add more modules 20 to the fitting 10, the main body 12 is removed from the floor 16. An additional module may be secured underneath the module 20". Further, any of the modules 20, 20', 20" may be removed and a new module may be substituted in place thereof. Further, because the main body 12 is easily removed from the floor 16, the receptacles 28 retained within the interior cavities 26 (as shown in FIG. 1), may be removed and replaced.

As shown in FIGS. 2 and 3, for example, the receptacles (or power and communication devices) 28 are positioned below the surface of the floor 16 when the main body 16 is secured by the collar 14. The modules 20, 20' and 20", and therefore, the receptacles 28, are stacked in a modular tiered arrangement, and as such, power and communication capacity may be increased without increasing the axial cross-sectional envelope (or diameter) of the fitting 10.

Figure 4:
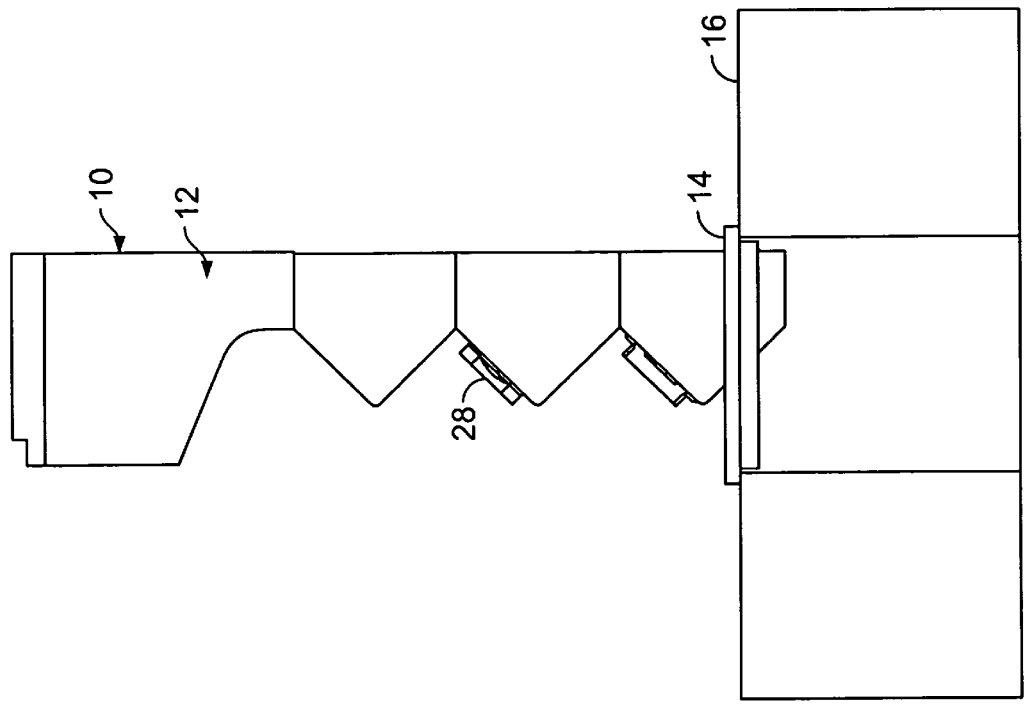
FIG. 4 illustrates a side view of a poke-thru fitting in which a main body of the poke-thru fitting is slid upwardly from a collar according to an embodiment of the present invention.

FIG. 4 illustrates a side view of the poke-thru fitting 10 in which the main body 12 is slid upwardly from the collar 14. In this position, electrical plugs may be removed and or positioned within different receptacles 28. Once the desired changes are made, the main body 12 may be slid downwardly to a secured position.

Thus, embodiments of the present invention provide a poke-thru fitting capable of supporting a large number of receptacles. Further, embodiments of the present invention provide a modular poke-thru fitting capable of supporting a varying number of receptacle modules. Further, embodiments of the present invention eliminate the need for empty space in a fitting due to the modularity of the poke-thru fitting 10. Thus, less fire-stopping material is used within the poke-thru fitting 10. Further, embodiments of the present invention provide a fitting in which all cabling may be bundled within a single passage, which may be sealed with a single water-resistant seal, thereby reducing the complexity of previous designs that used multiple seals.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. An improved poke-thru fitting configured to be positioned within a floor, said poke-thru fitting comprising:
 a plurality of vertically stacked modules that are angled within the poke-thru fitting, each of said plurality of vertically stacked modules being removably secured to another of said plurality of vertically stacked modules, and each of said plurality of vertically stacked modules retaining at least one of a power receptacle and a communication receptacle; and
 an intumescent material that expands when exposed to heat.

2. The improved poke-thru fitting of claim 1, wherein each of said plurality of stacked modules is snapably secured to another of said plurality of stacked modules.

3. The poke-thru fitting of claim 1, wherein a first of said plurality of stacked modules is stacked over a second of said plurality of stacked modules.

4. The poke-thru fitting of claim 1, wherein each of said plurality of stacked modules is interchangeable.

5. The poke thru-fitting of claim 1, further comprising an upper cable-receiving portion secured to a first one of said plurality of stacked modules.

6. The poke-thru fitting of claim 5, further comprising a collar configured to be secured within the floor, wherein said upper cable-receiving portion is configured to be slidably retained by said collar.

7. The poke-thru fitting of claim 1, wherein a first of said plurality of stacked modules is secured directly to a second of said plurality of stacked modules.

8. The poke-thru fitting of claim 7, wherein a bottom of said first of said plurality of stacked modules is secured directly to a top of said second of said plurality of stacked modules.

9. An improved poke-thru fitting configured to be positioned within a floor, said poke-thru fitting comprising:
a plurality of stacked modules that are angled within the poke-thru fitting, each of said plurality of stacked modules being removably secured to another of said plurality of stacked modules, each of said plurality of stacked modules retaining at least one of a power receptacle and a communication receptacle, wherein an axial cross-sectional envelope of the fitting remains constant despite the number of said plurality of stacked modules;
an upper cable-receiving portion secured to a first one of said plurality of stacked modules;
a collar configured to be secured within the floor, wherein said upper cable-receiving portion is configured to be slidably retained by said collar; and
an intumescent material that expands when exposed to heat.

10. The improved poke-thru fitting of claim 9, wherein each of said plurality of stacked modules is snapably secured to another of said plurality of stacked modules.

11. The poke-thru fitting of claim 9, wherein each of said plurality of stacked modules is interchangeable.

12. The poke-thru fitting of claim 9, wherein a first of said plurality of stacked modules is secured directly to a second of said plurality of stacked modules.

13. The poke-thru fitting of claim 12, wherein a bottom of said first of said plurality of stacked modules is secured directly to a top of said second of said plurality of stacked modules.

14. A poke-thru fitting comprising:
a plurality of stacked modules that are angled within the poke-thru fitting, each of said plurality of stacked modules being removably secured to another of said plurality of stacked modules;
an intumescent material that expands when exposed to heat;
an upper cable-receiving portion secured to a first one of said plurality of stacked modules; and
a collar configured to be secured within the floor, wherein said upper-cable receiving portion is configured to be slidably retained by said collar.

15. The improved poke-thru fitting of claim 14, wherein each of said plurality of stacked modules is snapably secured to another of said plurality of stacked modules.

16. The poke-thru fitting of claim 14, wherein a first of said plurality of stacked modules is secured directly to a second of said plurality of stacked modules.

17. The poke-thru fitting of claim 16, wherein a bottom of said first of said plurality of stacked modules is secured directly to a top of said second of said plurality of stacked modules.

18. An improved poke-thru fitting configured to be positioned within a floor, said poke-thru fitting comprising:
a plurality of stacked modules, each of said plurality of stacked modules being angled within the poke-thru fitting, each of said plurality of stacked modules being removably secured to another of said plurality of stacked modules, and each of said plurality of stacked modules retaining at least one of a power receptacle and a communication receptacle.

* * * * *